(12) United States Patent
Tyan (10) Patent No.: US 10,266,207 B2
(45) Date of Patent: Apr. 23, 2019

(54) BI-HEXAGONAL VEHICLE BEAM WITH CELLULAR STRUCTURE

(71) Applicant: Ford Global Technologies, LLC, Dearborn, MI (US)

(72) Inventor: Tau Tyan, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 2 days.

(21) Appl. No.: 15/586,729

(22) Filed: May 4, 2017

(65) Prior Publication Data

US 2018/0319441 A1 Nov. 8, 2018

(51) Int. Cl.
*B62D 21/15* (2006.01)
*B62D 25/02* (2006.01)
*B62D 25/04* (2006.01)
*B62D 25/06* (2006.01)
*B60R 19/04* (2006.01)

(52) U.S. Cl.
CPC .............. *B62D 21/15* (2013.01); *B60R 19/04* (2013.01); *B62D 25/025* (2013.01); *B62D 25/04* (2013.01); *B62D 25/06* (2013.01)

(58) Field of Classification Search
CPC ...... B62D 21/15; B62D 25/025; B62D 25/04; B62D 25/06; B60R 19/04

USPC ............................................ 296/37.8, 187.03
See application file for complete search history.

(56) References Cited

U.S. PATENT DOCUMENTS

| | | | | |
|---|---|---|---|---|
| 6,405,974 B1* | 6/2002 | Herrington | ......... | B29C 47/0023 138/148 |
| 6,821,638 B2* | 11/2004 | Obeshaw | ................ | B21C 37/15 138/148 |
| 8,641,129 B2 | 2/2014 | Tyan et al. | | |
| 9,174,678 B2 | 11/2015 | Tyan et al. | | |

FOREIGN PATENT DOCUMENTS

| KR | 100775806 B1 | 11/2007 |
|---|---|---|
| KR | 20160075190 A | 6/2016 |
| WO | 2016067361 A1 | 5/2016 |

\* cited by examiner

*Primary Examiner* — Joseph D. Pape
*Assistant Examiner* — Dana D Ivey
(74) *Attorney, Agent, or Firm* — Vichit Chea; Brooks Kushman, P.C.

(57) ABSTRACT

A bumper support beam for a vehicle is provided. The bumper support beam includes an outer and an inner periphery each having six walls. The beam may include a plurality of ribs that may be disposed between the inner and outer periphery of the beam. The ribs may be arranged to define a plurality of triangular cells that increase the compressive strength of the beam.

20 Claims, 7 Drawing Sheets

BI-HEXAGONAL VEHICLE BEAM WITH CELLULAR STRUCTURE

TECHNICAL FIELD

This disclosure relates to beams in vehicles that provide improved reaction forces against crush loads.

BACKGROUND

Vehicle frames may include a variety of beams that make up structure of the vehicle. Cross beams may extend between longitudinal frame rails to provide sufficient resistance to side impacts. Pillars are beams that support the vehicle roof and resist crush loads. Bumper support beams extend between a vehicle frame and front or rear bumpers to absorb energy associated with front or rear impacts. More stringent fuel and emissions standards have created the need to reduce the weight of vehicles. However, vehicle safety standards and ratings require strengthening of beams to increase absorption of energy and improve crash performance. Stronger lighter-weight materials have been incorporated in vehicles by primarily changing the materials of the beams. But changing to lightweight materials may not be sufficient to minimize weight and improve crash worthiness.

A beam incorporating a number of cells disposed between inner and outer walls of the beam may not provide sufficient stiffness or energy absorption. An improperly designed beam may have poor initial stability, resulting in a single or double buckling hinge within a portion of the column or beam that is spaced apart from the application point of the load. Other designs may result in a stable crush, but they may have a low slenderness ratio and thus have large and non-uniform folding lengths. Generally, a stronger beam requires a beam with larger outer perimeter or cross-section, this may present a challenge for using the beam in relatively small or compact areas. Moreover, a range of strength requirements may require various beams having various outer dimensions. This may lead to a more complex and complicated design.

The present disclosure is directed to achieving fuel economy driven weight reduction in vehicle beams and structural walls while maximizing compressive strength and energy absorption during a crash. This disclosure is also directed to providing a consistent set of beams having various strengths and fewer variations of the outer dimensions.

SUMMARY

According to one aspect of this disclosure, a bumper support beam for a vehicle is provided. The bumper support beam includes an outer and an inner periphery each having six walls. The beam may include a plurality of ribs that may be disposed between the inner and outer periphery of the beam. The ribs may be arranged to define a plurality of triangular cells or polygonal cells that increase the compressive strength of the beam.

The plurality of ribs and the walls of the inner and outer peripheries may be arranged to form two right-angle triangular cells adjacent to each of the walls defining the inner periphery.

The inner periphery includes six corners and at least six ribs may each extend radially outwardly from six corners of the inner periphery to the outer periphery. The at least six ribs and the inner and outer peripheries may define six pentagonal cells. Each of the pentagonal cells may include a plurality interstitial web links ribs that further define a triangular reinforcement.

A set of ribs may extend radially outwardly from the inner periphery to each of the six corners of the outer periphery and bifurcate each of the pentagonal cells.

The support beam may define a center point and the outer and inner peripheries may define six corners. The six corners of the inner periphery may be spaced apart from the center point by a distance $R_i$ and the six corners of the outer periphery may be spaced apart from the center point by a distance $R_o$. A ratio of $R_o$ and $R_i$ may range from $$10.0 > \frac{R_o}{R_i} > 1.25.$$

According to another aspect of this disclosure, a vehicle structural member is provided. The structural member includes a hexagonal outer periphery formed by six walls having a radius $R_o$ and a hexagonal inner periphery formed by six walls having a radius $R_i$. The structural includes a plurality of ribs that may be disposed between the inner and outer peripheries. $R_o$ and $R_i$ may be each sized to have a ratio at least greater than 1.25, $R_o$ and $R_i$ may also have a ratio no greater than 10.

The plurality of ribs may be disposed between the inner and outer peripheries may be arranged so that they form a plurality of triangular cells.

Each of the six walls of the inner periphery may define a midpoint. First and second ribs may extend between the midpoint and a corner of the hexagonal outer periphery. The first rib may have a length $L_{ad}$ and the second rib may have a length $L_{ae}$. A ratio of $L_{ad}$ and $L_{ae}$ may range from 0.25 to 4.0.

The hexagonal inner periphery may include six corners. At least six ribs may each extend from the six corners to the hexagonal outer periphery. The at least six ribs and the hexagonal inner and outer peripheries may define six pentagonal cells.

According to another aspect of this disclosure, a vehicle beam having an elongated hexagonal outer tube and an elongated hexagonal inner tube is provided. The elongated hexagonal outer tube may define a first radius $R_o$ and the elongated hexagonal inner tube may define a second radius $R_i$ that is smaller than the first. A ratio of $R_o$ and $R_i$ may be at least greater than 1.5. The inner tube is disposed within the outer tube. The beam may include a plurality of ribs extending radially outwardly from the inner tube to the outer tube defining at least six pentagons wherein the plurality of ribs increases the compressive strength of the member.

Each of the six pentagonal cells may further define at least six triangular cells.

The elongated hexagonal outer and inner tubes are comprised of six walls, each having a midpoint, and connected by six corners. A first set of ribs may extend from each of the six corners of the elongated hexagonal inner tube to the midpoint of each of the walls of the elongated hexagonal outer tube. A second set of ribs may extend from the midpoint of each of the walls of the elongated hexagonal inner tube to each of the six corners of the elongated hexagonal outer tube.

The beam may include a set of interstitial web links form a triangular reinforcement between the first and second sets of ribs.

The third set of ribs may include a first rib and a second rib. The first rib may extend from a midpoint of one of the walls of the elongated hexagonal outer tube to one of the ribs of the second set.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
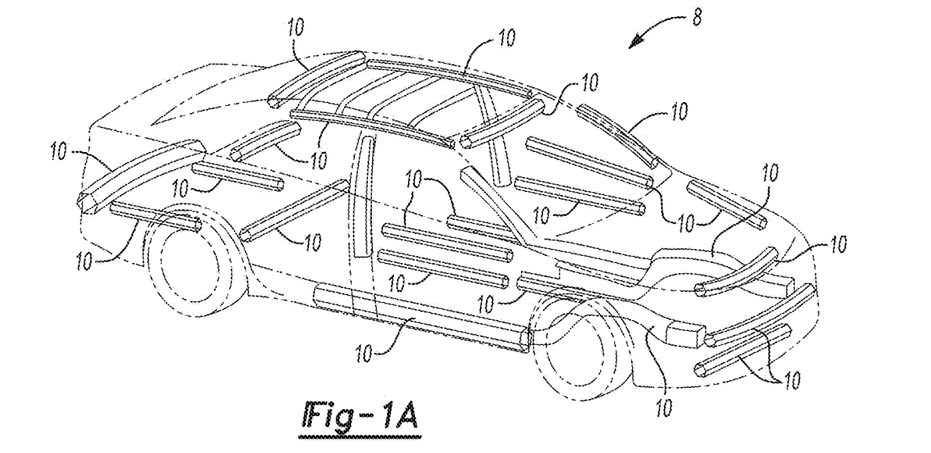
FIGS. 1A-1B is a perspective view of a vehicle according to one embodiment of this disclosure.
Figure 1B:
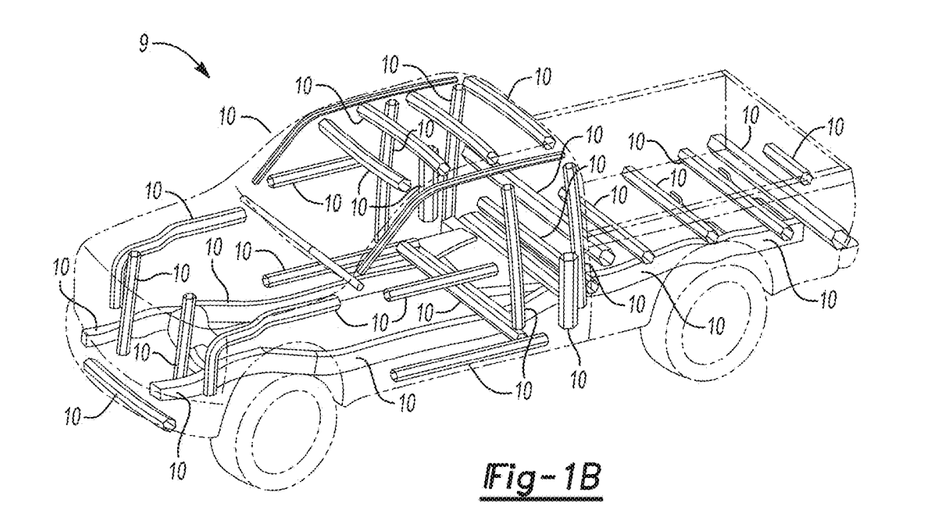

Referring to FIG. 1A, a perspective view of a vehicle frame 8, particularly a sedan, is illustrated. The vehicle frame 8 includes multiple bi-hexagonal cellular beams 10 according to at least one embodiment of this disclosure. FIG. 1B is a perspective view of a vehicle frame 9, particularly a truck, including multiple bi-hexagonal cellular beams 10 according to at least one embodiment of this disclosure. Within each vehicle frame 8, 9, the bi-hexagonal cellular beams 10 may be implemented in various components, including but not limited to, a crush can, a front rail, a front side rail, a rear side rail, a rear rail, a frame cross member, a shotgun, a hinge-pillar, an A-pillar, B pillar, C-pillar, a door beam, a cross car beam, a front header, a rear header, a cow top, a roof rail, a lateral roof bow, a longitudinal roof bow, a body cross member, a back panel cross member, a rocker, an underbody cross member, a beltline, and an IP cross-car beam.

Although the multiple bi-hexagonal cellular beams 10 are shown implemented within a vehicle frame, the beams may also be implemented in other applications, including but not limited to, aircraft, space craft, marine vehicles or other primary movers requiring a high energy absorbing and lightweight structure.

Figure 2A:
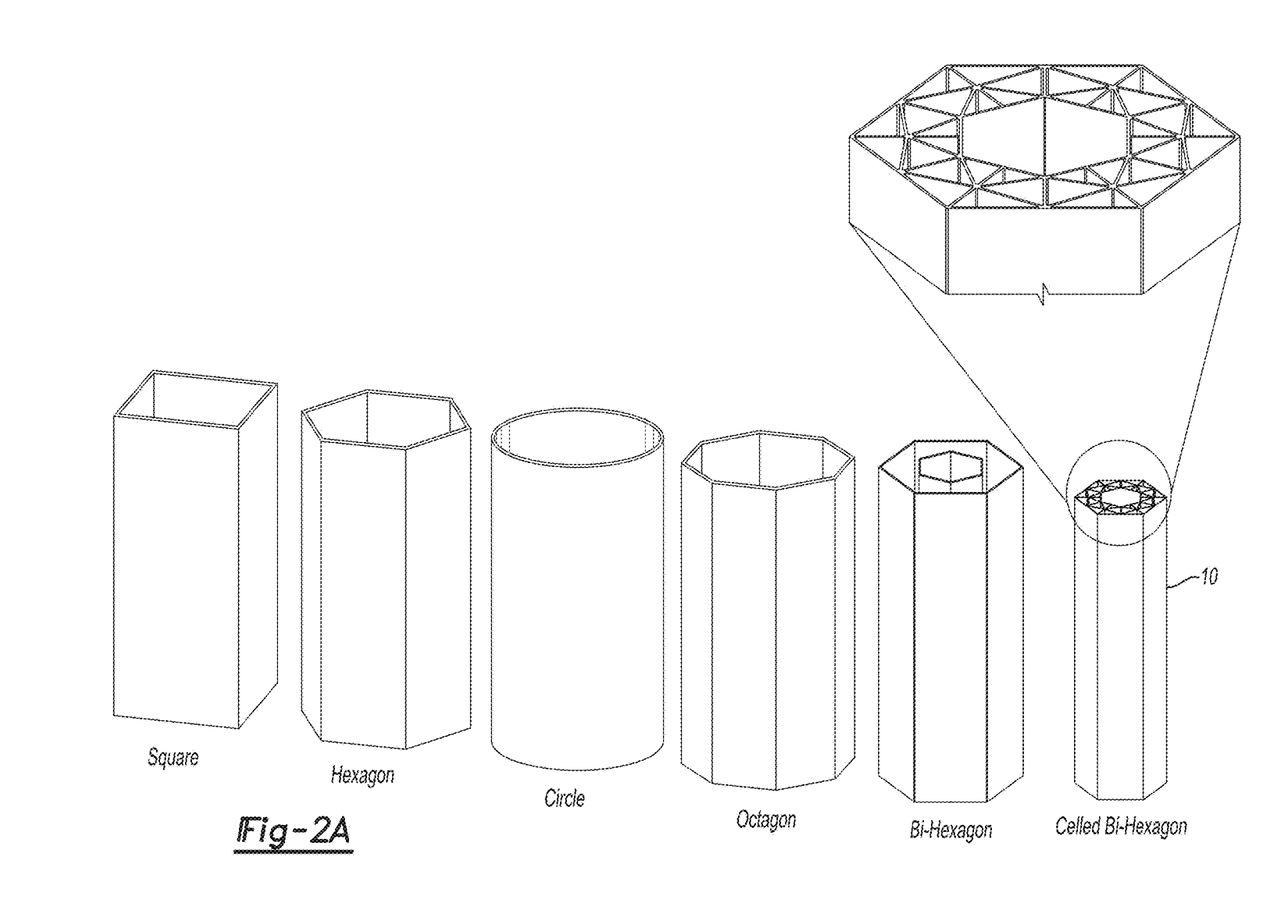
FIGS. 2A-2B is a perspective view of structural walls of varying cross sections with the same mass and an exemplary axial collapse of the same.
Figure 2B:
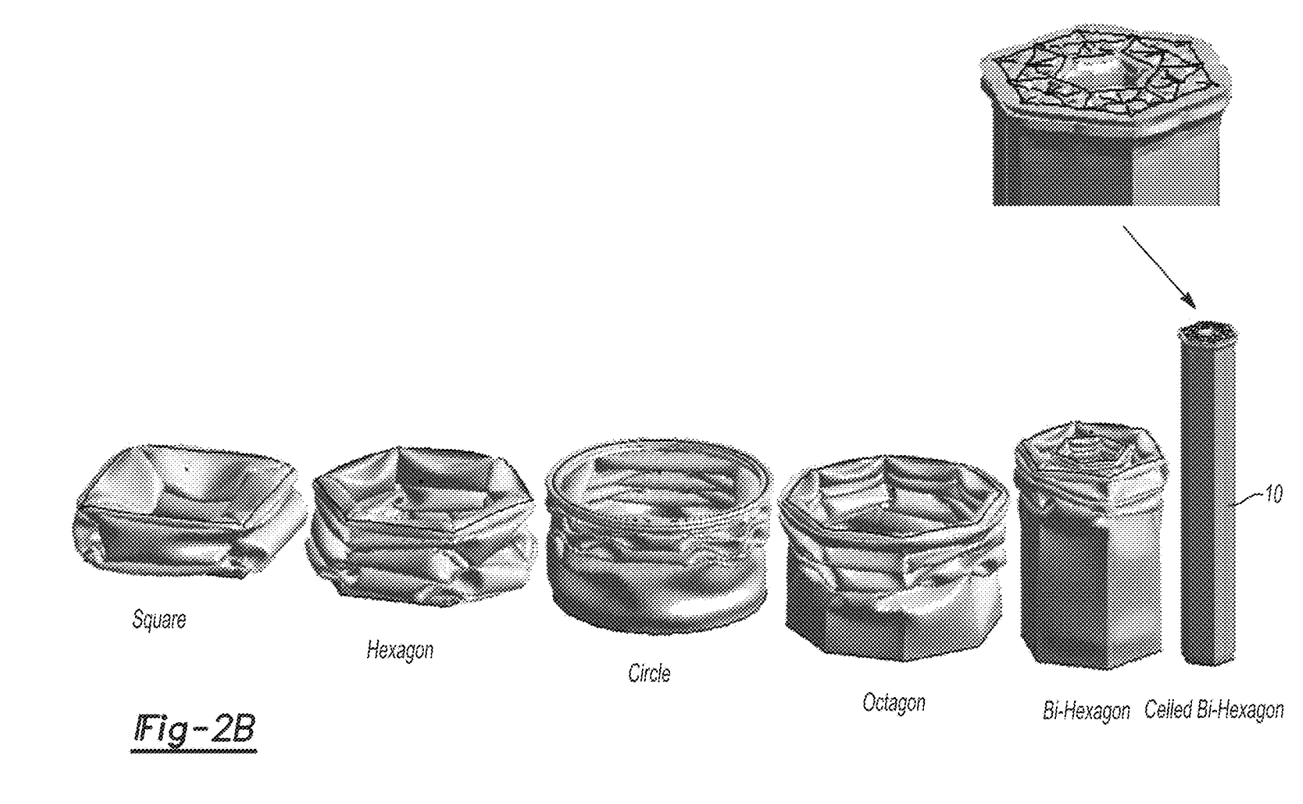

Referring to FIGS. 2A-2B, a perspective view of structural members of varying cross sections and an exemplary axial collapse of the same is illustrated. More specifically the figure shows a comparison of the crash energy absorption of strengthening members, e.g. square, hexagon, circle, octagon, bi-hexagon, and the bi-hexagonal cellular beam 10 for an impact with a rigid wall at 35 mph. The bi-hexagonal cellular beam 10 demonstrated the shortest crush distance and smallest folding length. Moreover, the bi-hexagonal cellular beam 10 also demonstrated the most stable axial collapse and the highest energy absorption. In fact, the bi-hexagonal cellular beam 10 can achieve approximately 400-700% increase in crash energy absorption over a square cross section and a 300-500% increase in average crush force or crash energy absorption over octagon and circle cross sections. Each of the structural members shown have identical material, material thickness, perimeter, height, mass, impactor mass, impact speed and boundary conditions.

Referring to FIGS. 3 through 5E, a bi-hexagonal cellular beam 10 according to one embodiment of this disclosure, is illustrated. The outer hexagonal tube of the beam is comprised of six walls or sides 12a-12f that connect at six corners that define an outer periphery 11. The six sides 12a-12f may have various lengths and thickness to meet strength and weight requirements. The inner hexagonal tube of the beam includes six inner walls 14a-14d, 16a-16b that connect at six corners that defines an inner periphery 13. In one or more embodiments, inner walls 16a-16b may be longer than the inner walls 14a-14d. The inner walls 14a-14d, 16a-16b of the inner periphery are arranged in a non-parallel orientation with respect to the six sides 12a-12f. In other words, the inner walls 16a and 16b are orthogonal to the walls 12a and 12b that form a point. But, in other embodiments the walls 16a and 16b may be parallel to walls 12a or 12d (within 10° degrees of one another).

Figure 3:
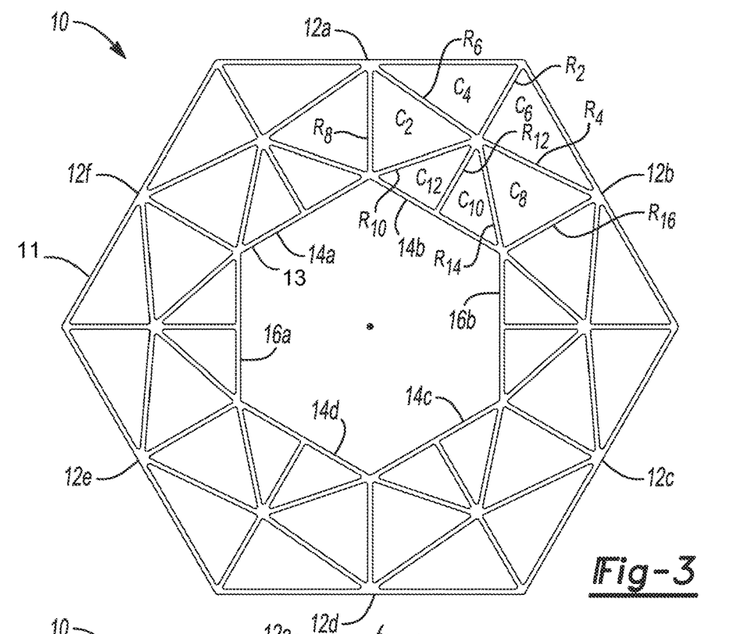
FIG. 3 is a top view of a structural beam according to one embodiment of this disclosure.

Ribs $R_2$-$R_{16}$ are disposed between the inner walls 14a-14d and the outer walls 12a-12f of the bi-hexagonal cellular beam 10. The ribs $R_2$-$R_{16}$ may also be referred to as segments, webs, walls, or web-links. The ribs or segments $R_2$-$R_{16}$ may vary in thickness to alter the compressive strength of the beam. In addition to the thickness, the length and orientation of the ribs are tunable parameters that allow the beam to be fine-tuned to control crush strength and bending resistance. These parameters may also be tuned to create preferred crush and bending modes for structures that are not uniform and not straight.

Ribs $R_2$ and rib $R_{12}$ extend between the outer corner defined by the outer walls 12a and 12b, though one rib, either $R_2$ or $R_{12}$ may extend between the outer corner to the midpoint of one of the inner walls. Rib $R_{10}$ extends from the corner of the inner tube defined by the inner walls 14a and 14b to a mid portion or connecting end of ribs $R_2$ and $R_{12}$. Rib $R_{14}$ extends from the corner of the inner tube defined by the inner walls 14b and 16b to a mid portion or connecting end of ribs $R_2$ and $R_{12}$. Rib $R_6$ extends from a midportion of outer wall 12a to a mid portion of ribs $R_2$ and $R_{12}$. Similarly, rib $R_4$ extends from a midportion of outer wall 12b to a mid portion or connecting ends of ribs $R_2$ and $R_{12}$.

The ribs $R_2$-$R_{16}$, sides 12 of the outer periphery, and the six-inner walls 14, 16 may be arranged to form triangular cells $C_2$-$C_{12}$. Triangular cells $C_4$ and $C_6$ are defined by the outer walls 12a and 12b and ribs $R_2$, $R_4$, and $R_6$. Cell $C_2$ is defined by ribs $R_8$, $R_{10}$, and $R_6$. Cell $C_8$ is defined by ribs $R_4$, $R_{12}$, and $R_{16}$. Triangular cells $C_{10}$ and $C_{12}$ are defined by ribs $R_{10}$, $R_{12}$, and $R_{14}$ and the inner wall 14b. The triangular cells and configuration of ribs or segments is repeated radially around the bi-hexagonal cellular beam 10.

While the ribs or segments are shown, and described above as being repeated radially around the bi-hexagonal cellular beam 10, ribs and segments may be removed all together. For instance, ribs $R_8$ may be removed to decrease the stiffness of the bi-hexagonal cellular beam 10 when loaded axially, while maintaining the stiffness of the bi-hexagonal cellular beam 10 under transverse loads. Contrastingly, ribs $R_2$ and $R_{12}$ between the outer corner defined by 12c and 12b may be removed to decrease the stiffness of the bi-hexagonal beam under transverse loads, while maintaining the compressive strength of the beam.

The beam or structural member 10 may have a fixed cross-sectional profile and may be formed by an extrusion process. The extrusion process may generally include heating a stock material, loading it into a container within a press and pressing the material to push it out of the die. Furthermore, the side lengths and configurations, and/or degrees of the internal and external angles, of the present teachings can achieve a similar, if not greater, strength increase as thickened corners, while minimizing mass per unit length of the member and maintaining a high manufacturing feasibility because the member can be formed by stamping, press forming, hydro-forming, molding, die casting, 3-D printing, and extrusion. The beam or structural member 10 may be made of various materials, including but not limited to aluminum alloys, magnesium alloys, polymers, and ceramics.

Figure 4:
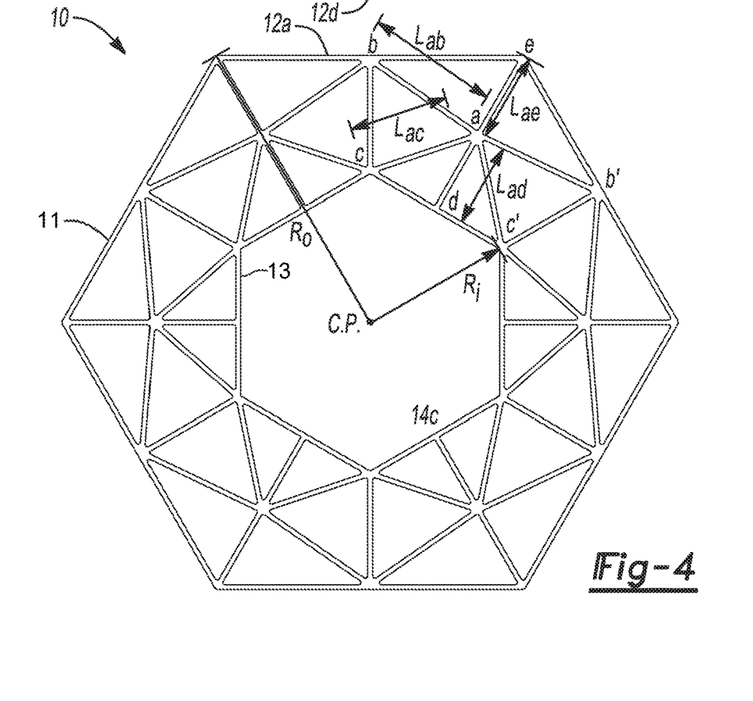
FIG. 4 is a top view of an example structural beam according to one embodiment of this disclosure.

Referring to FIG. 4, a bi-hexagonal cellular beam 10 according to one embodiment of this disclosure, is illustrated. A center point "C.P." marks the center of the inner and outer peripheries. $R_o$ represents the distance between the center point "C.P." to an outer corner "e" of the outer periphery. $R_i$ represents the distance between the center point "C.P." to an inner corner "c." A ratio of $R_o/R_i$ may be between 1.25 and 10. As was described above, the ribs or segments $R_2$-$R_{16}$ may have various lengths. $R_6$ may extend between point b and point and has a length $L_{ab}$. Two ribs $R_{12}$ and $R_2$ extend between the midpoint "d" of the inner wall 14b to the outer corner "e" of the outer periphery. The rib $R_{12}$ between "a" and "d" may have a length $L_{ad}$ and $L_{ae}$ the rib $R_2$ between point "a" and the outer corner "e" has a length $L_{ae}$. The lengths $L_{ad}$ and $L_{ae}$ may vary and in turn, point a may move closer to the inner periphery or closer to the outer periphery to change the energy absorption characteristics of the beam.

Referring to FIGS. 5A-5E, a top view of various bi-hexagonal cellular beam 10 according to one or more embodiments of this disclosure, is illustrated. Each beam 10a-10e includes six outer walls 12a-12f that connect at six corners. The six sides or walls 12a-12f may have various lengths and thickness to meet strength and weight requirements. The inner walls 14a-14d, 16a-16b of the inner periphery are arranged in a non-parallel orientation with respect to the six sides 12a-12f. In other words, the inner walls 16a and 16b are orthogonal to the walls 12a and 12d that form a point. But, in other embodiments the walls 16a and 16b may be parallel to walls 12a or 12b. The beams 10a-10e may have more or less ribs depending on the required strength of the beam. Depending on the required strength, the number of ribs may be increased or decreased. Altering the number of ribs allows various beams having the same outer perimeter or diameter for various structural components of the vehicle. Fewer ribs provides for a lighter weight beam and an increased crush distance or deflection under loads. More ribs make the beam heavier and decrease the amount of crush distance or deflection under load.

The bi-hexagonal cellular beam 10A (FIG. 5A) includes four different ribs arranged in a pattern that is repeated radially around the beam. Ribs $R_2$ and rib $R_{12}$ extend between the outer corner defined by the outer walls 12a and 12b, though one rib, either $R_2$ or $R_{12}$ may extend between the outer corner to the midpoint of one of the inner walls. Rib $R_{10}$ extends from the corner of the inner tube defined by the inner walls 14a and 14b to a mid-portion or connecting-end of ribs $R_2$ and $R_{12}$. Rib $R_{14}$ extends from the corner of the inner tube defined by the inner walls 14b and 16b to a mid-portion or connecting-end of ribs $R_2$ and $R_{12}$. Triangular cells $C_{10}$ and $C_{12}$ are defined by ribs $R_{10}$, $R_{12}$, and $R_{14}$ and the inner wall 14b. This pattern and configuration of ribs or segments is repeated radially around the bi-hexagonal cellular beam 10. Five pentagonal cells $C_{14}$ are formed by ribs $R_{10}$, $R_{12}$, $R_{14}$ and the outer walls 12a-12f.

The bi-hexagonal cellular beam 10B (FIG. 5B) includes four different ribs arranged in a pattern that is repeated radially around the beam. Rib $R_2$ and rib $R_{12}$ extend between the outer corner defined by the outer walls 12a and 12b, though one rib, either $R_2$ or $R_{12}$ may extend between the outer corner to the midpoint of one of the inner walls. Triangular cells $C_4$ and $C_6$ are defined by the outer walls 12a and 12b and ribs $R_2$, $R_4$, and $R_6$. The triangular cells and configuration of ribs or segments are repeated radially around the bi-hexagonal cellular beam 10. The repeated pattern of ribs and segments defines six hexagonal cells $C_{16}$ defined by $R_4$, and $R_6$ and the inner walls 14a-14d and 16a-16b.

The bi-hexagonal cellular beam 10C (FIG. 5C) includes four different ribs arranged in a pattern that is repeated radially around the beam. Rib $R_{10}$ extends from the corner of the inner tube defined by the inner walls 14a and 14b to the end of rib $R_{14}$. Rib $R_{14}$ extends from the corner defined by the inner walls 14b and 16b to the end of rib $R_{10}$. Rib $R_6$ extends from a midportion of outer wall 12a to the end of ribs $R_{10}$ and $R_{14}$. Similarly, rib $R_4$ extends from a midportion of outer wall 12b to the end of ribs $R_{10}$ and $R_{14}$. Triangular cell $C_{22}$ is defined by the outer walls 12a-12f and ribs $R_4$, and $R_6$. Triangular cell $C_{18}$ is defined by the inner walls 14a-14d, 16a-16b and ribs $R_{10}$, and $R_{14}$. Triangular cells $C_{20}$ are defined by ribs $R_4$, $R_6$, $R_{10}$, and $R_{14}$.

The bi-hexagonal cellular beam 10D (FIG. 5D) includes six different ribs arranged in a pattern that is repeated radially around the beam. Except for the addition of rib $R_8$, extending between a midpoint of the outer walls 12a-12f to the corners defined by the inner walls, the bi-hexagonal cellular beam 10D has a substantially similar cellular structure as the bi-hexagonal cellular beam 10C. Cell $C_{24}$ is defined by ribs $R_8$, $R_{10}$, and $R_6$. Cell $C_8$ is defined by ribs $R_4$, $R_{12}$, and $R_{14}$.

Figure 5A:
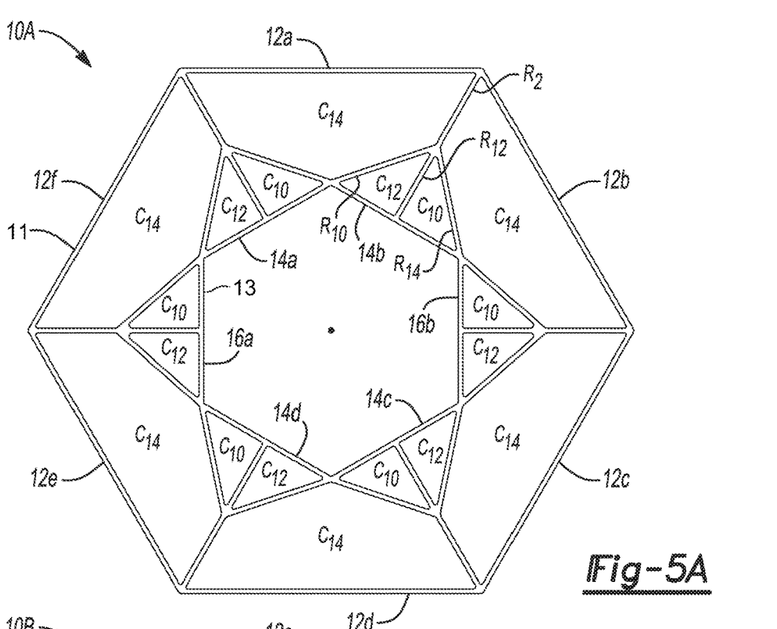
FIGS. 5A-5E is a top view of structural beams according to one or more embodiments of this disclosure.
Figure 5B:
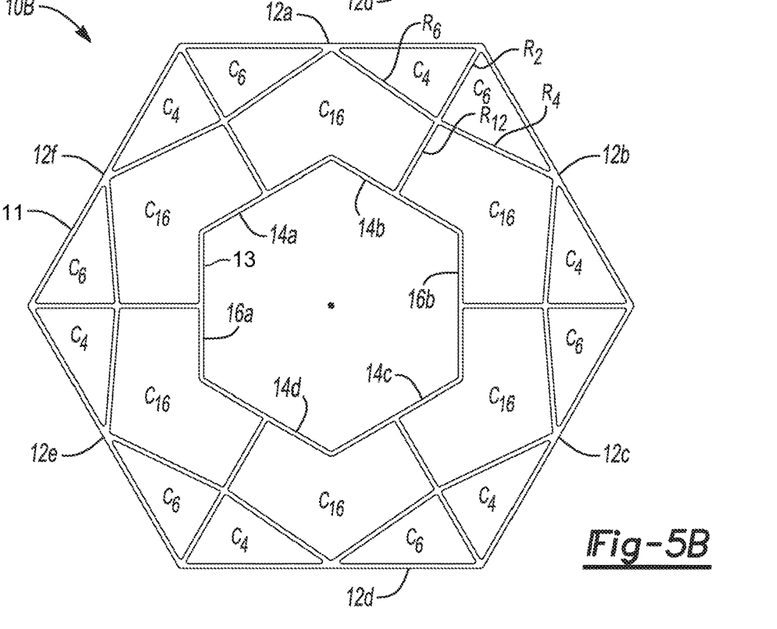
Figure 5C:
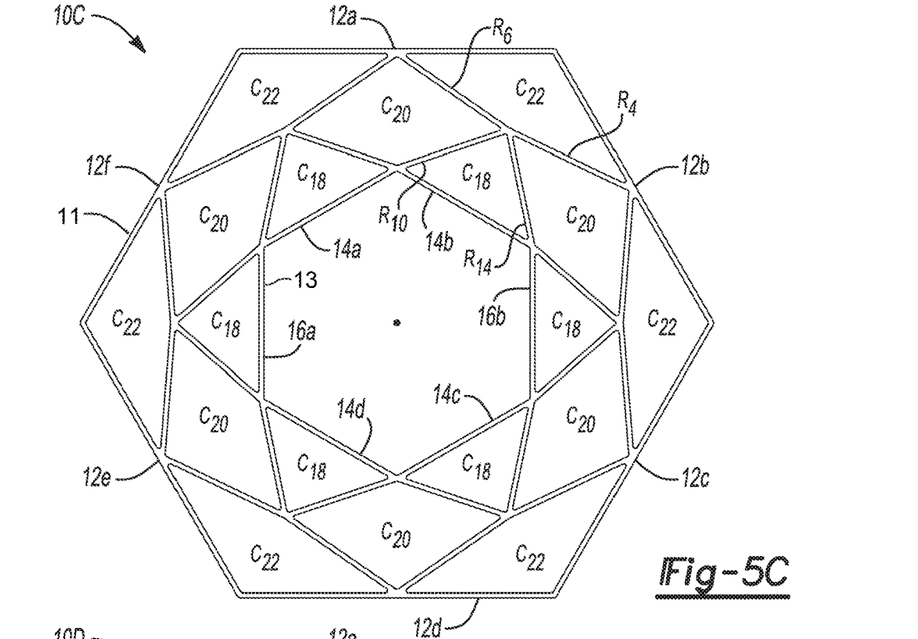
Figure 5D:
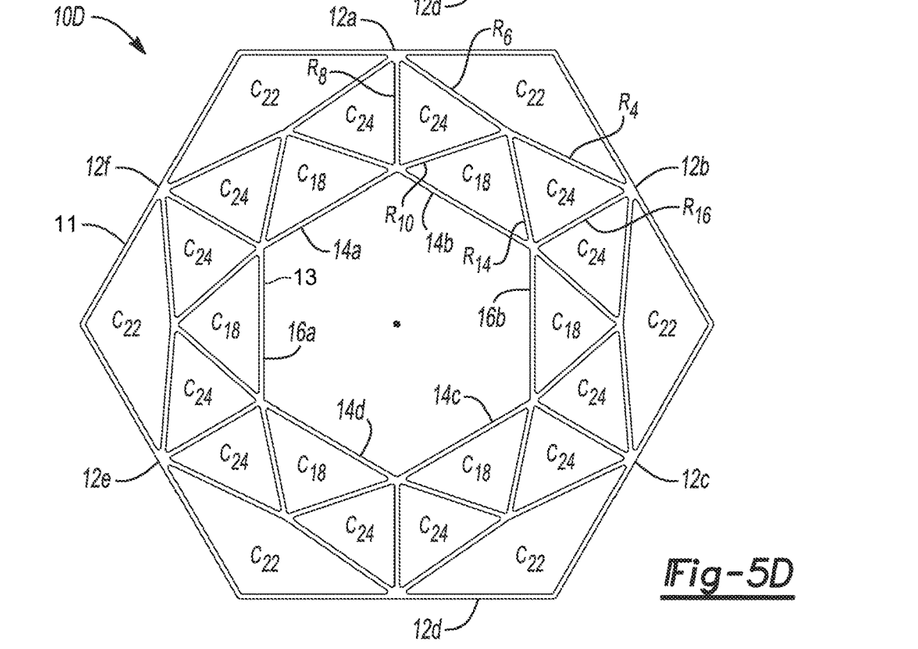
Figure 5E:
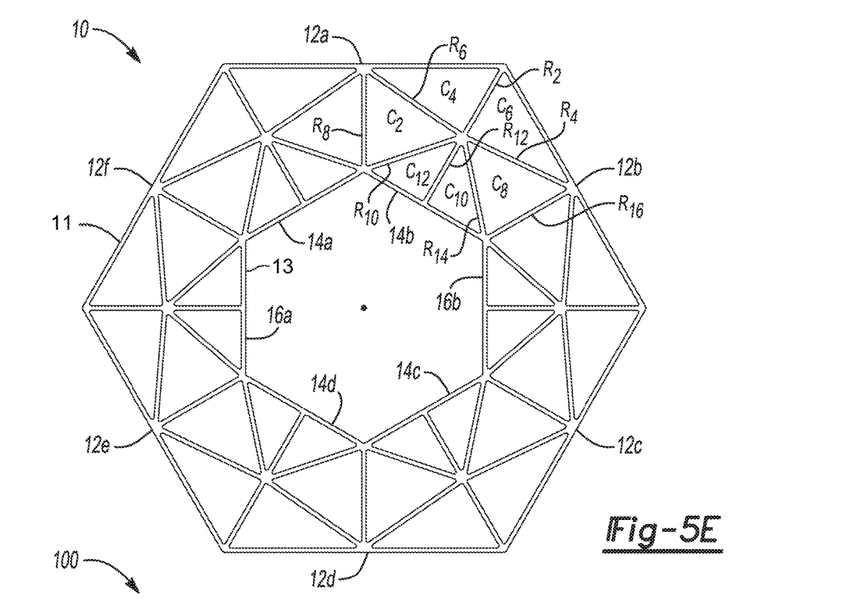

FIG. 5E illustrates a bi-hexagonal cellular beam 10 that is identical to that in FIG. 3.

Those of ordinary skill in the art would understand, however, that FIGS. 5A-5E are exemplary only, and are provided merely to illustrate how design parameters can be utilized to modulate the cross section of the exemplary embodiment of FIG. 3. Thus, as above, the present teachings contemplate various bi-hexagonal cellular cross section configurations having various shapes and dimensions (i.e., corner bend radii, side lengths and/or thicknesses), which can be adjusted based on space requirements and/or to control member collapse modes.

In some exemplary embodiments, some or all the cells of an exemplary cellular structure may be partially or wholly filled with various fillers. Further, more than one cellular structure may be provided, and with some or all of one or more of the cellular structures having some or all the cells of the given structure being partially or wholly filled with one or more types of fillers. For example, where temperature control is desired, some or all the cells may be partially or wholly filled with thermally insulating filler(s). Exemplary thermally insulating fillers include various foams (e.g., blown fiber glass foam, polyurethane foams), mineral wool, cellulose, polystyrene aerogels, cork, and combinations thereof. Additionally or alternatively, in other various exemplary embodiments, where sound control is required, some or all of the cells of the exemplary cellular structure(s) may be partially or wholly filled with noise insulating filler(s). Exemplary noise insulating fillers include sponge(s) melamine acoustic foams, mineral wool, open-cell rubber foams, and combinations thereof. In further various exemplary embodiments, where further structural reinforcement is desired, the cells may be partially or wholly filled with strengthening filler(s). Exemplary strengthening fillers include structural foam(s), such as thermoplastic structural foams, aluminum foams, glass or carbon fiber-reinforced structural foams, closed-cell polymer foams, and combinations thereof. In some exemplary embodiments, more than one type of filler may be incorporated in the cells. In some other exemplary embodiments, a filler may provide more than one, or even all, of the thermally insulating, noise insulating, and strengthening functions and may partially or wholly fill some or all the cells of the exemplary cellular structure(s). Alternatively, some or all the cells may be left unfilled (i.e., hollow or empty).

Figure 6:
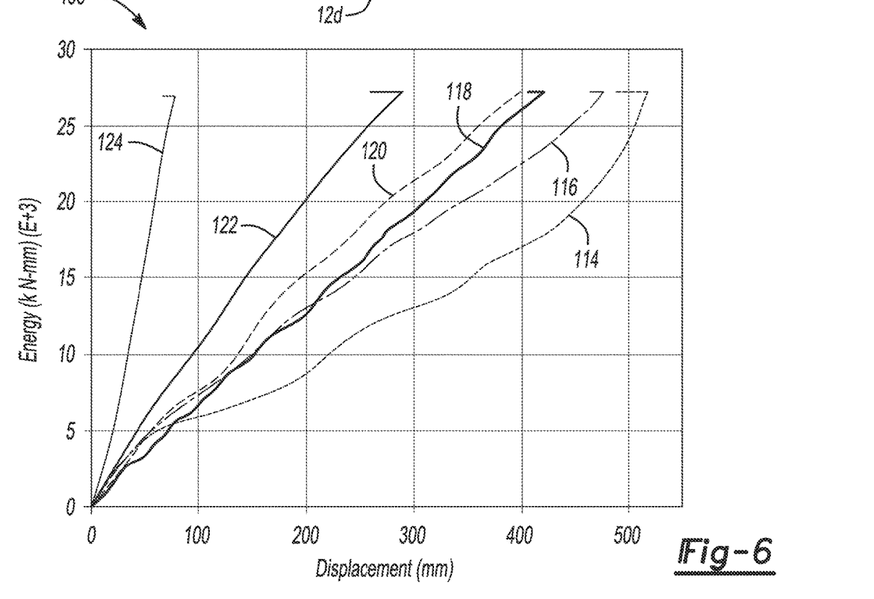
FIG. 6 is a graph comparing crush energy absorption for several beams having a cross section corresponding to FIGS. 2A-2B.

Referring to FIG. 6, a crush energy chart is identified by reference numeral 100. The crush energy chart provides a comparison of beams made in accordance with the embodiment of FIGS. 2A-2B. The beams tested were of identical material thickness, material thickness, perimeter, and height, but had different shapes. In the crush energy chart 100, line 114 illustrates the performance of a square beam indicating that the displacement in response to 27,500 kN·mm was approximately 520 mm. Line 116 illustrates the performance of a hexagonal beam which at 27,500 kN·mm was approximately 475 mm. Line 118 illustrates a circular beam in the test and indicates that at 27,500 kN·mm resulted in a displacement of approximately 410 mm. Line 120 illustrates the crush energy performance of an octagonal beam which at 27,500 kN·mm, the displacement was approximately 400 mm. Line 122 illustrates that in the same test the bi-hexagonal beam without a celled structure provided energy absorption of 27,500 kN·mm with a displacement of approximately 290 mm. Line 124 illustrates the performance of a tube made according to FIG. 3, FIG. 4, and FIG. 5E provided energy absorption of 27,500 kN·mm with a displacement of approximately 80 mm.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bumper support beam for a vehicle comprising:
   an outer periphery having six walls;
   an inner periphery having six walls; and
   ribs disposed between the inner and outer periphery wherein the ribs and the walls of the inner and outer peripheries are arranged to form two right-angle triangular cells adjacent to each of the walls defining the inner periphery.

2. The beam of claim 1, wherein the inner periphery includes six corners wherein at least one rib extends radially outwardly from each of the six corners of the inner periphery to the outer periphery wherein the at least one rib and the inner and outer peripheries define six pentagonal cells.

3. The beam of claim 2, further comprising a plurality interstitial web links disposed within each of the six pentagonal cells and further defining a triangular reinforcement.

4. The beam of claim 3, wherein a set of ribs extends radially outwardly from the inner periphery to each of the six corners of the outer periphery and bifurcate each of the pentagonal cells.

5. The beam of claim 1, wherein the support beam defines a center point, the outer periphery defines six corners and the inner periphery defines six corners, wherein the six corners of the inner periphery are spaced apart from the center point by a distance $R_i$ and the six corners of the outer periphery are spaced apart from the center point by a distance $R_o$ wherein a ratio of $R_o$ and $R_i$ ranges between $$10.0 > \frac{Ro}{Ri} > 1.25.$$

6. A vehicle structural member comprising:
   a hexagonal outer periphery, formed by six walls connected by six corners, having a radius $R_o$;
   a hexagonal inner periphery, formed by six inner walls each defining a midpoint, having a radius $R_i$; and
   a plurality of ribs each disposed between each midpoint of the six inner walls and each of the six corners defined by the hexagonal outer periphery.

7. The structural member of claim 6, wherein $R_o$ and $R_i$ are each sized to have a ratio no greater than 10.

8. The structural member of claim 6, wherein the plurality of ribs disposed between the inner and outer periphery are arranged so that they form a plurality of triangular cells.

9. The structural member of claim 6, wherein each of the six walls of the inner periphery define a midpoint wherein a first rib and a second rib extend between the midpoint and a corner of the hexagonal outer periphery.

10. The structural member of claim 9, wherein the first rib has a length $L_{ad}$ and the second rib has a length $L_{ae}$ a ratio of $L_{ad}$ and $L_{ae}$ ranges between 0.25 to 4.0.

11. The structural member of claim 6, wherein the hexagonal inner periphery includes six corners wherein at least six ribs each extend from the six corners to the hexagonal outer periphery wherein the at least six ribs and the hexagonal inner and outer peripheries define six pentagonal cells.

12. The structural member of claim 11, wherein a set of ribs extends radially outwardly from the hexagonal inner periphery to each of the six corners of the hexagonal outer periphery and bifurcate each of the pentagonal cells.

13. The structural member of claim 6, wherein a ratio of $R_o$ and $R_i$ is at least greater than 1.25.

14. A vehicle beam comprising:
    an elongated hexagonal outer tube;
    an elongated hexagonal inner tube disposed within the outer tube; and
    a first set of ribs extending from each of the six corners of the elongated hexagonal inner tube to a midpoint of each of the walls of the elongated hexagonal outer tube to define at least six pentagonal cells.

15. The beam of claim 14, wherein a ratio of $R_o$ and $R_i$ is at least greater than 1.25.

16. The beam of claim 14, wherein a ratio of $R_o$ and $R_i$ is no greater than 10.

17. The beam of claim 14, further comprising a plurality interstitial web links that define a plurality of triangular cells within each of the six pentagonal cells.

18. The beam of claim 17, wherein the elongated hexagonal outer tube and the elongated hexagonal inner tube each have six walls connected at six corners; and
   wherein a second set of ribs extend from a midpoint of each of the walls of the elongated hexagonal inner tube to each of the six corners of the elongated hexagonal outer tube.

19. The beam of claim 18, wherein a set of interstitial web links form a triangular reinforcement between the first and second sets of ribs.

20. The beam of claim 19, wherein the set of interstitial web links includes a first link and a second link, wherein the first link extends from a midpoint of one of the walls of the elongated hexagonal outer tube to one of the ribs of the second set and the second link extends from one of the six corners of the elongated hexagonal inner tube to one of the ribs of the second set.

\* \* \* \* \*